(12) United States Patent
Koga

(10) Patent No.: US 10,355,786 B2
(45) Date of Patent: Jul. 16, 2019

(54) OPTICAL MODULATOR, OPTICAL TRANSMITTER, AND OPTICAL MODULATION METHOD

(71) Applicant: NEC Corporation, Minato-ku, Tokyo (JP)

(72) Inventor: Tadashi Koga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/761,504

(22) PCT Filed: Sep. 15, 2016

(86) PCT No.: PCT/JP2016/004220
§ 371 (c)(1),
(2) Date: Mar. 20, 2018

(87) PCT Pub. No.: WO2017/056440
PCT Pub. Date: Apr. 6, 2017

(65) Prior Publication Data
US 2018/0269980 A1  Sep. 20, 2018

(30) Foreign Application Priority Data
Sep. 28, 2015 (JP) .................................. 2015-189327

(51) Int. Cl.
*H04B 10/54* (2013.01)
*G02F 1/01* (2006.01)
(Continued)

(52) U.S. Cl.
CPC ............. *H04B 10/541* (2013.01); *G02F 1/01* (2013.01); *G02F 1/0123* (2013.01); *G02F 1/225* (2013.01); *H04B 10/556* (2013.01)

(58) Field of Classification Search
CPC ........ H04B 10/541; H04B 10/556; G02F 1/01; G02F 1/0123; G02F 1/225
(Continued)

(56) References Cited

U.S. PATENT DOCUMENTS 5,805,321 A * 9/1998 Ooi .................. G02F 1/0123
398/183
6,118,564 A * 9/2000 Ooi .................... H04Q 11/0001
398/1
(Continued)

FOREIGN PATENT DOCUMENTS

JP   H03-251815 A   11/1991
JP   2003-295138 A  10/2003
(Continued)

OTHER PUBLICATIONS

International Search Report for PCT Application No. PCT/JP2016/004220, dated Dec. 20, 2016.
(Continued)

*Primary Examiner* — Kenneth N Vanderpuye
*Assistant Examiner* — Dibson J Sanchez

(57) ABSTRACT

In order to provide an optical modulator capable of controlling a bias voltage to correspond to transmission characteristics of a modulation means even when a multi-level modulation scheme is applied, an optical modulator 10 is provided with: an amplitude information control means 20 that generates amplitude information for controlling the amplitude of an information signal to correspond to transmission characteristics of a modulation means 50, adds a dither signal to the amplitude information, and outputs the amplitude information; a bias value control means 30 that generates and outputs a bias value for controlling the center of the amplitude of the information signal to correspond to the transmission characteristics of the modulation means 50; a data output means 40 that corrects the amplitude of
(Continued)

information data on the basis of the amplitude information, and outputs the information data as the information signal; the modulation means 50 that corrects the center of the amplitude of the information signal on the basis of the bias value, modulates continuous wave light by using the information signal, and outputs a modulation signal; and an adjustment means 60 that extracts, from the modulation signal, the dither signal added to the amplitude information, and adjusts the amplitude information and the bias value such that the differential value of the intensity of the dither signal added to the amplitude information becomes zero.

16 Claims, 11 Drawing Sheets

(51) Int. Cl.
*H04B 10/556* (2013.01)
*G02F 1/225* (2006.01)

(58) Field of Classification Search
USPC .................................................. 398/182–201
See application file for complete search history.

(56) References Cited

U.S. PATENT DOCUMENTS

| | | | | |
|---|---|---|---|---|
| 6,539,038 | B1* | 3/2003 | Wilkerson, Jr. | G02F 1/0123 372/25 |
| 6,687,451 | B1* | 2/2004 | Sikora | H04B 10/50572 398/187 |
| 7,257,332 | B2* | 8/2007 | Imai | G02F 1/0123 398/182 |
| 7,817,923 | B2* | 10/2010 | Akiyama | G02F 1/0123 398/183 |
| 8,145,069 | B2* | 3/2012 | Tanaka | H04B 10/505 398/182 |
| 8,463,138 | B2* | 6/2013 | Sugihara | G02F 1/0123 398/182 |
| 9,158,137 | B1* | 10/2015 | Abbas | H04B 10/50575 |
| 9,166,697 | B2* | 10/2015 | Le Taillandier de Gabory | G02F 1/0123 |
| 2001/0007508 | A1* | 7/2001 | Ooi | G02F 1/0123 359/245 |
| 2004/0161249 | A1* | 8/2004 | Suda | H04B 10/503 398/198 |
| 2005/0105917 | A1 | 5/2005 | Narusawa et al. | |
| 2005/0191060 | A1* | 9/2005 | Gronbach | H04B 10/505 398/183 |
| 2006/0127103 | A1* | 6/2006 | Mazurczyk | H04B 10/505 398/188 |
| 2006/0263098 | A1* | 11/2006 | Akiyama | G02F 1/0123 398/188 |
| 2007/0280700 | A1* | 12/2007 | Remedios | H04B 10/07 398/183 |
| 2008/0170864 | A1* | 7/2008 | Nishihara | H04B 10/5162 398/188 |
| 2009/0003840 | A1* | 1/2009 | Nahapetian | H04B 10/505 398/183 |
| 2010/0129088 | A1* | 5/2010 | Akasaka | H04B 10/50577 398/188 |
| 2012/0155880 | A1* | 6/2012 | Nishimoto | H04B 10/50572 398/79 |
| 2013/0028614 | A1* | 1/2013 | Ishii | H04B 10/50595 398/187 |
| 2013/0101296 | A1 | 4/2013 | Nishimoto | |
| 2013/0135704 | A1* | 5/2013 | Fujisaku | H04B 10/50575 359/279 |
| 2014/0233963 | A1* | 8/2014 | Le Taillandier De Gabory | H04B 10/541 398/183 |
| 2014/0334829 | A1 | 11/2014 | Akiyama | |
| 2015/0071583 | A1 | 3/2015 | Nishimoto et al. | |
| 2015/0188639 | A1* | 7/2015 | Akashi | H04B 10/50575 398/197 |
| 2015/0244467 | A1 | 8/2015 | Shibutani | |
| 2015/0270905 | A1 | 9/2015 | Rasmussen et al. | |
| 2016/0156416 | A1 | 6/2016 | Shirakawa | |

FOREIGN PATENT DOCUMENTS

| | | |
|---|---|---|
| JP | 2005-148329 A | 6/2005 |
| JP | 2008-092172 A | 4/2008 |
| JP | 2010-062654 A | 3/2010 |
| JP | 2011-150052 A | 8/2011 |
| JP | 2012-141565 A | 7/2012 |
| JP | 2013-090292 A | 5/2013 |
| JP | 2015-162720 A | 9/2015 |
| JP | 2016-102870 A | 6/2016 |
| WO | 2013/114628 A1 | 8/2013 |

OTHER PUBLICATIONS

English translation of Written opinion for PCT Application No. PCT/JP2016/004220.

Japanese Office Action for JP Application No. 2017-542719 dated Mar. 5, 2019 with English Translation.

* cited by examiner

FIG. 7
(a)
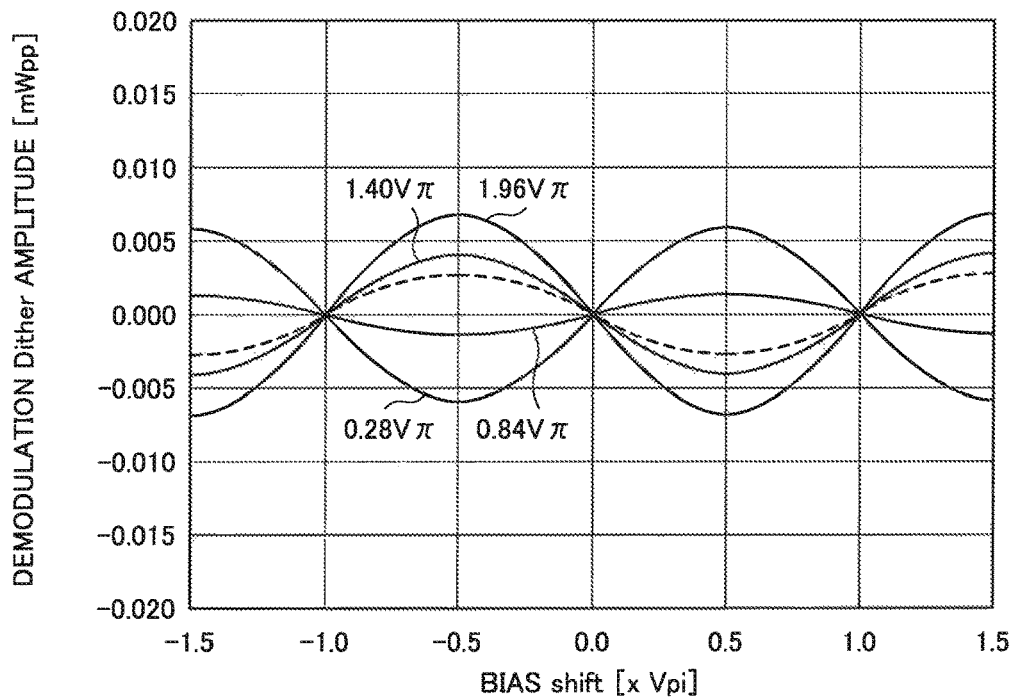
(b)
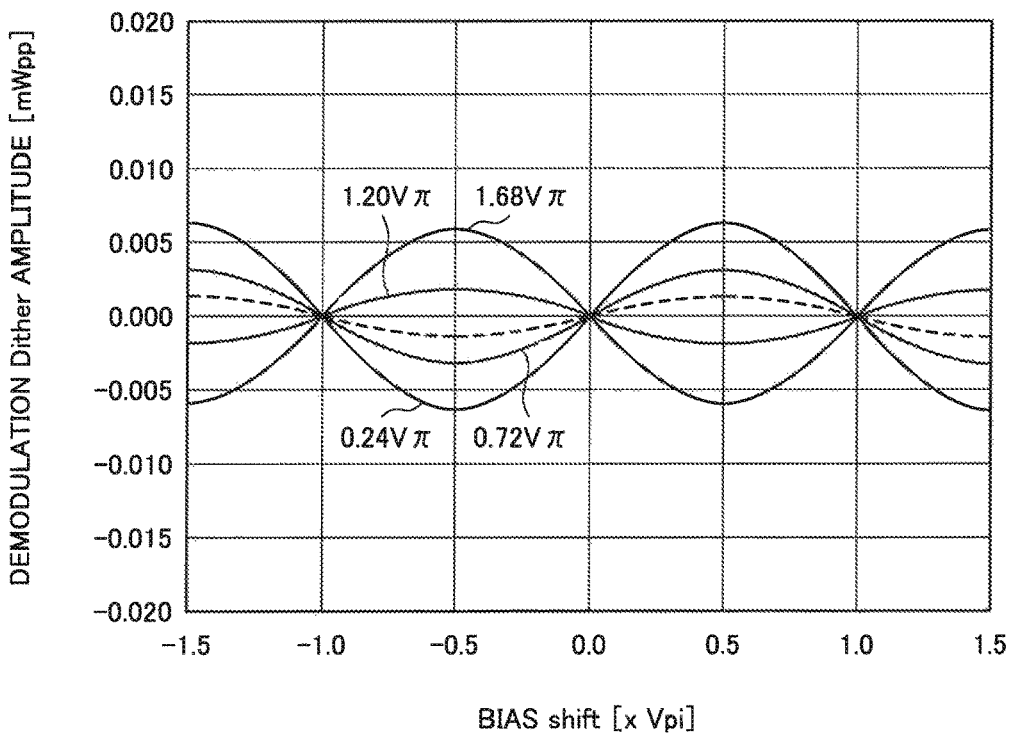

FIG. 8
(a)
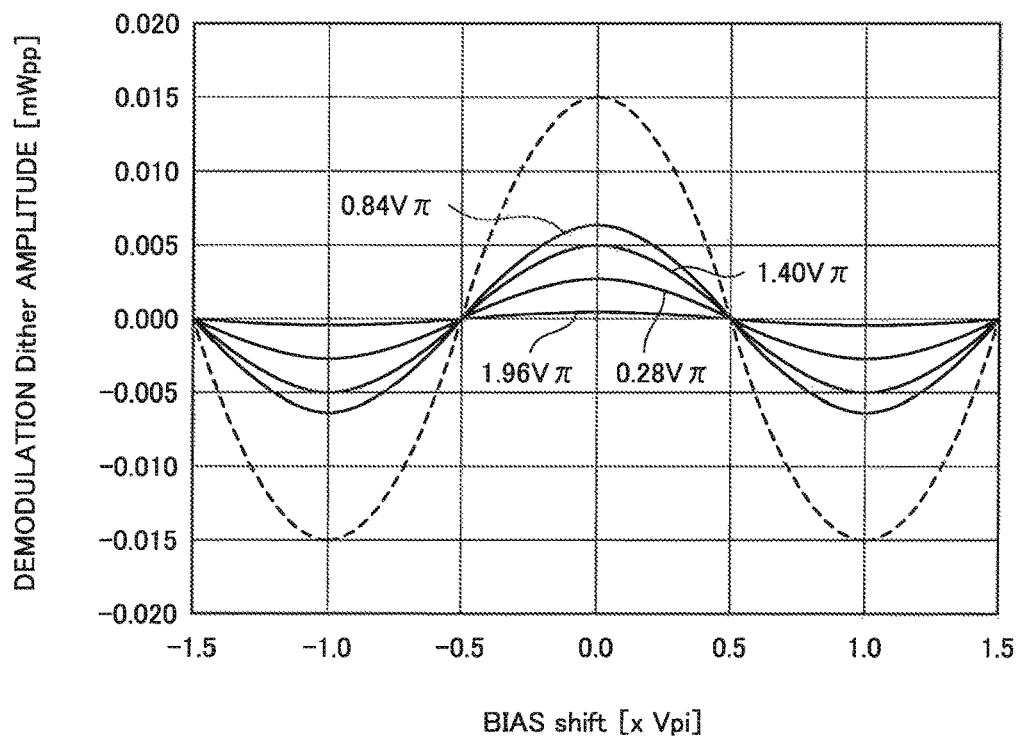
(b)
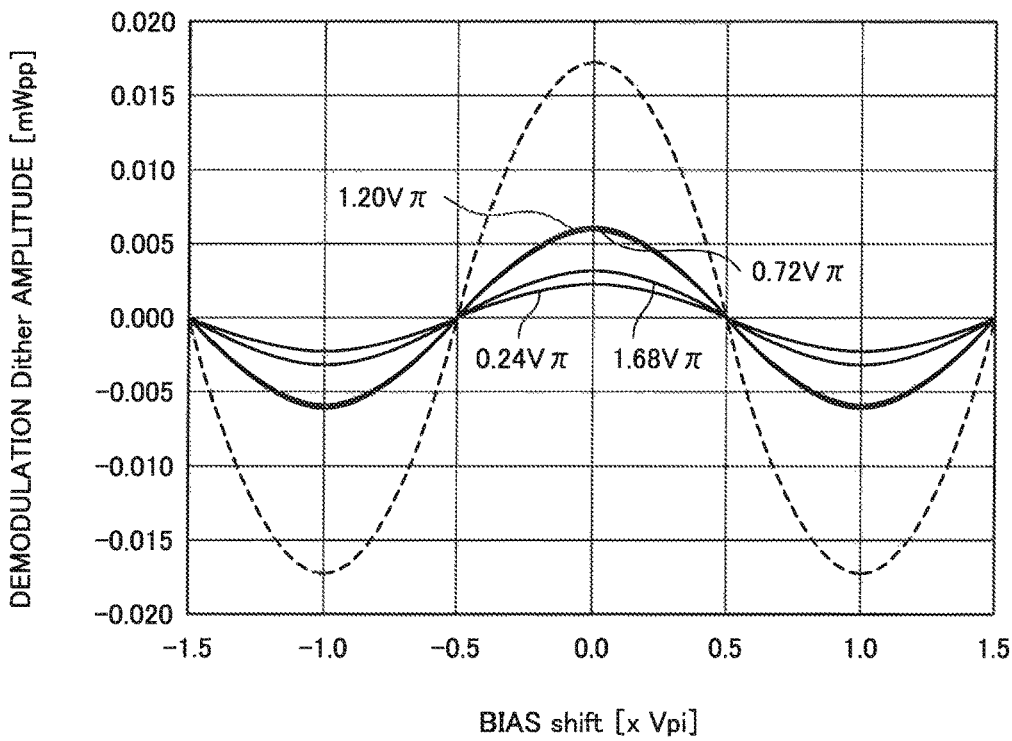

OPTICAL MODULATOR, OPTICAL TRANSMITTER, AND OPTICAL MODULATION METHOD

This application is a National Stage Entry of PCT/JP2016/004220 filed on Sep. 15, 2016, which claims priority from Japanese Patent Application 2015-189327 filed on Sep. 28, 2015, the contents of all of which are incorporated herein by reference, in their entirety.

TECHNICAL FIELD

The present invention relates to an optical modulator, an optical transmitter, and an optical modulation method.

BACKGROUND ART

Ultrafast long-distance optical transmission systems at 40 Gbit/s and 100 Gbit/s or faster are becoming widespread succeeding optical transmission systems at 2.5 Gbit/s and 10 Gbit/s. An optical phase shift keying scheme and a digital coherent reception scheme are the most likely to be adopted in the ultrafast long-distance optical transmission system. Herein, the optical phase shift keying scheme has excellent characteristics required in long-distance optical fiber transmission, such as optical signal-to-noise ratio resistant characteristics, chromatic dispersion resistant characteristics, and polarization mode dispersion resistant characteristics. In the digital coherent reception scheme, coherent detection on a reception side and a digital signal processing technology are combined together.

A binary phase shift keying (BPSK) scheme and a quadrature phase shift keying (QPSK) scheme are particularly the most promising among phase modulation schemes in terms of balance of a transmission characteristic, easiness of fabrication, and a cost. Furthermore, consideration is also underway regarding a quadrature amplitude modulation (QAM) scheme having excellent spectral efficiency of optical frequency usage in order to increase a transmission capacity without increasing an optical frequency bandwidth being used. Optical multi-level phase and amplitude modulation schemes such as 16 QAM and 64 QAM respectively using a quadrature drive signal and an octal drive signal have been actively researched and developed. PTLs 1 to 5, for example, disclose these optical transmission schemes in detail.

PTL 1 discloses an optical modulation device that superimposes a low-frequency signal on a bias voltage, extracts the superimposed low-frequency signal from a modulation signal output from a modulator, and controls the bias voltage of the modulator, and that also superimposes a low-frequency signal on an amplitude control signal provided to a drive circuit, extracts the superimposed low-frequency signal from a modulation signal, and controls an amplitude of the modulation signal.

CITATION LIST

Patent Literature

[PTL 1] Japanese Laid-open Patent Publication No. 2012-141565
[PTL 2] Japanese Laid-open Patent Publication No. 2011-150052
[PTL 3] Japanese Laid-open Patent Publication No. 2005-148329
[PTL 4] Japanese Laid-open Patent Publication No. 2003-295138
[PTL 5] Japanese Laid-open Patent Publication No. H3-251815

SUMMARY OF INVENTION

Technical Problem

Herein, the technology of PTL 1 effectively functions in the binary or quadrature phase shift keying scheme, such as BPSK and QPSK, but does not effectively function in the multi-level modulation schemes such as 16 QAM and 64 QAM having a higher multilevel degree. The reason is that drive electric signal amplitudes also need to be driven as different amplitudes of a quadrature signal or an octal signal in the multi-level modulation schemes such as 16 QAM and 64 QAM, and even when a low-frequency signal is superimposed on the amplitudes individually, the total power of the low-frequency signal extracted from a modulation signal output from a modulator is not zero at an optimum point unlike the binary or quadrature phase shift keying scheme.

The present invention has been made in view of the above-mentioned problems, and an object thereof is to provide an optical modulator, an optical transmitter, and an optical modulation method capable of controlling a bias voltage to correspond to transmission characteristics of a modulation means even when a multi-level modulation scheme is applied.

Solution to Problem

In order to achieve the above-mentioned object, an optical modulator according to the present invention includes: an amplitude information control means for generating amplitude information for controlling an amplitude of an information signal to correspond to a transmission characteristic of a modulation means, adding a dither signal to the amplitude information, and outputting the amplitude information; a bias value control means for generating and outputting a bias value for controlling the center of an amplitude of the information signal to correspond to a transmission characteristic of the modulation means; a data output means for correcting an amplitude of input information data, based on the output amplitude information, and outputting the information data as the information signal; a modulation means for correcting the center of an amplitude of the output information signal, based on the output bias value, modulating input continuous wave light by using the information signal, and outputting a modulation signal; and an adjustment means for extracting a dither signal added to the amplitude information from the output modulation signal, and adjusting the generated amplitude information and the generated bias value in such a way that a differential value of intensity of the extracted dither signal added to the amplitude information is set to zero.

In order to achieve the above-described object, an optical transmitter according to the present invention includes: an output light means for generating and outputting continuous wave light; and the above-mentioned optical modulator configured to modulate the output continuous wave light.

In order to achieve the above-mentioned object, an optical modulation method according to the present invention includes: generating amplitude information for controlling an amplitude of an information signal to correspond to a transmission characteristic of a modulation means, adding a dither signal to the amplitude information, and outputting the amplitude information; generating and outputting a bias value for controlling the center of an amplitude of the information signal to correspond to a transmission characteristic of the modulation means; correcting an amplitude of output information data, based on the output amplitude information and outputting the information data as the information signal; correcting the center of an amplitude of the output information signal, based on the output bias value, by using the modulation means; modulating continuous wave light by using the information signal, and outputting a modulation signal; and extracting a dither signal added to the amplitude information from the output modulation signal, and adjusting the generated amplitude information and the generated bias value in such a way that a differential value of intensity of the extracted dither signal added to the amplitude information is set to zero.

Advantageous Effects of Invention

According to the above-mentioned aspects of the present invention, even when a multi-level modulation scheme is applied, a bias voltage can be controlled to correspond to a transmission characteristic of a modulation means.

BRIEF DESCRIPTION OF DRAWINGS

FIG. 7 is simulation results when control using the DC bias value on which the low-frequency dither signal is superimposed is applied.

FIG. 8 is simulation results when control using a drive amplitude on which the low-frequency dither signal is superimposed is applied.

DESCRIPTION OF EMBODIMENTS

<First Example Embodiment>

Figure 1:
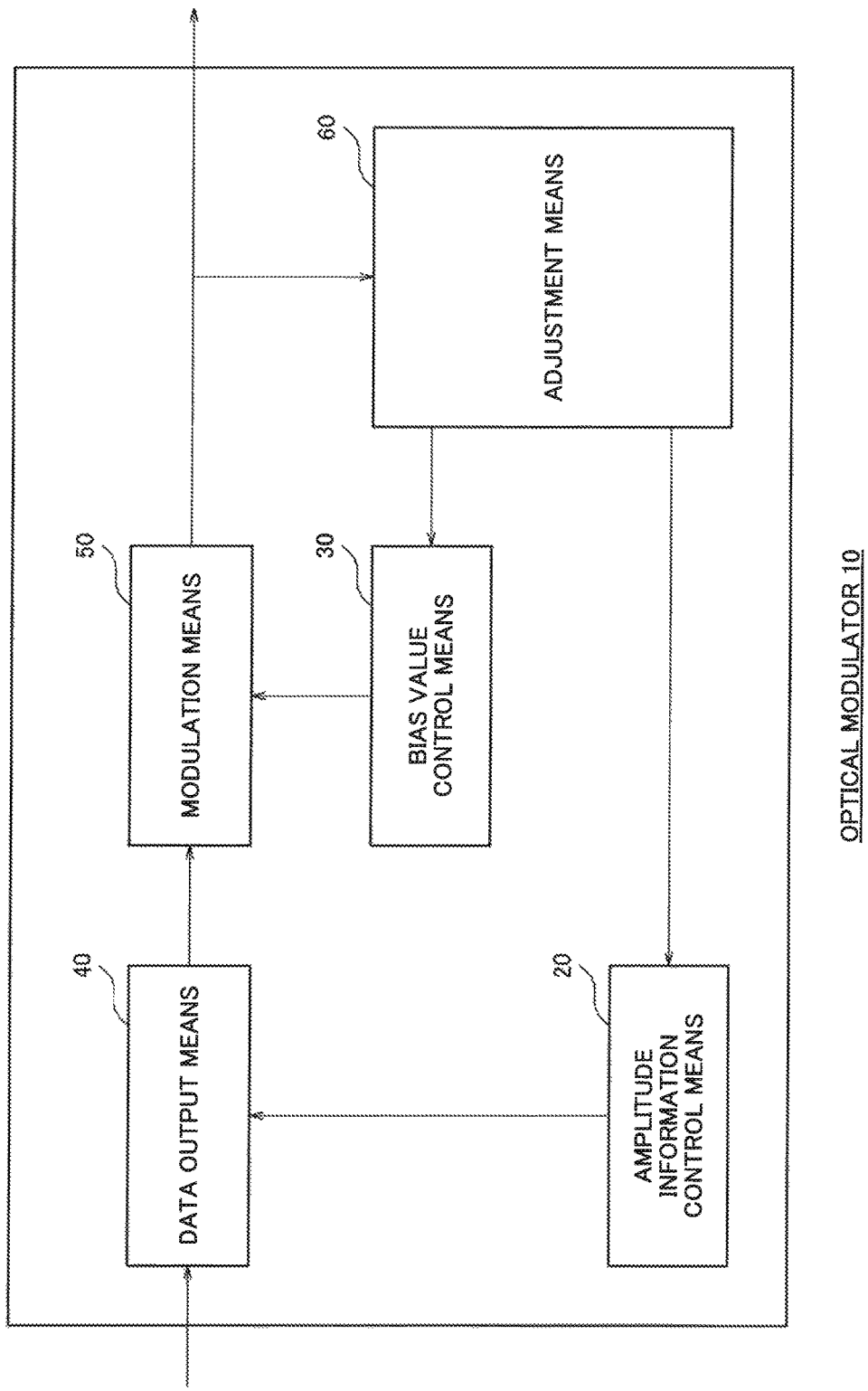
FIG. 1 is a block configuration diagram of an optical modulator 10 according to a first example embodiment.

A first example embodiment of the present invention will be described. A block configuration diagram of an optical modulator according to the present example embodiment is illustrated in FIG. 1. In FIG. 1, an optical modulator 10 includes an amplitude information control means 20, a bias value control means 30, a data output means 40, a modulation means 50, and an adjustment means 60.

The amplitude information control means 20 generates amplitude information for controlling an amplitude of an information signal to correspond to transmission characteristics of the modulation means 50, adds a dither signal to the amplitude information, and outputs the amplitude information to the data output means 40. Herein, the amplitude information control means 20 according to the present example embodiment generates amplitude information that sets an amplitude of an information signal to be equal to a difference between a maximum value and a minimum value of transmission characteristics of the modulation means 50.

The bias value control means 30 generates a bias value for controlling the center of the amplitude of the information signal, namely, a bias voltage, to correspond to the transmission characteristics of the modulation means 50 and outputs the bias value to the modulation means 50. The bias value control means 30 according to the present example embodiment generates a bias value that sets a bias voltage to a minimum point of the transmission characteristics of the modulation means 50.

The data output means 40 corrects the amplitude of input information data based on the amplitude information input from the amplitude information control means 20 and outputs the information data as the information signal to the modulation means 50.

The modulation means 50 corrects the center of the amplitude of the information signal input from the data output means 40, namely, the bias voltage, based on the bias value input from the bias value control means 30. The modulation means 50 then modulates continuous wave light by using the input information signal with the bias voltage corrected and outputs a modulation signal.

The adjustment means 60 extracts the dither signal added to the amplitude information from the modulation signal output from the modulation means 50. The adjustment means 60 then adjusts the amplitude information generated by the amplitude information control means 20 and the bias value generated by the bias value control means 30 in such a way that a differential value of intensity of the extracted dither signal added to the amplitude information is set to zero.

In the optical modulator 10 formed as described above, the amplitude information control means 20 outputs amplitude information to which a dither signal is added to the data output means 40, and the data output means 40 corrects an amplitude of the information data based on the amplitude information and outputs the information signal to the modulation means 50. Furthermore, the modulation means 50 generates a modulation signal by using the corrected information signal based on the amplitude information to which the dither signal is added. The adjustment means 60 according to the present example embodiment then extracts the dither signal added to the amplitude information from the modulation signal output from the modulation means 50, and adjusts the amplitude information generated by the amplitude information control means 20 and the bias value generated by the bias value control means 30 in such a way that a differential value of intensity of the extracted dither signal added to the amplitude information is set to zero. In this case, even when a multi-level modulation scheme is applied, an amplitude of the information signal and the center of the amplitude can be controlled to correspond to the transmission characteristics of the modulation means 50.

Note that in the optical modulator 10 according to the present example embodiment, a bias value generated by the bias value control means 30 to which a dither signal is added can also be output. In this case, the adjustment means 60 extracts the dither signal added to the bias value from the output modulation signal, and adjusts amplitude information generated by the amplitude information control means 20 and the bias value generated by the bias value control means 30 in such a way that a period of the dither signal added to the extracted bias value is set to a double period. Such an optical modulator 10 acquires an applied modulation scheme from a framer circuit or the like installed at a previous stage, and selects a control procedure of adding a dither signal to a bias value when a binary modulation scheme is applied and selects a control procedure of adding a dither signal to amplitude information when a multi-level modulation scheme is applied. Note that this selection can be performed by a switching means, which is not illustrated in FIG. 1.

<Second Example Embodiment>

Figure 2:
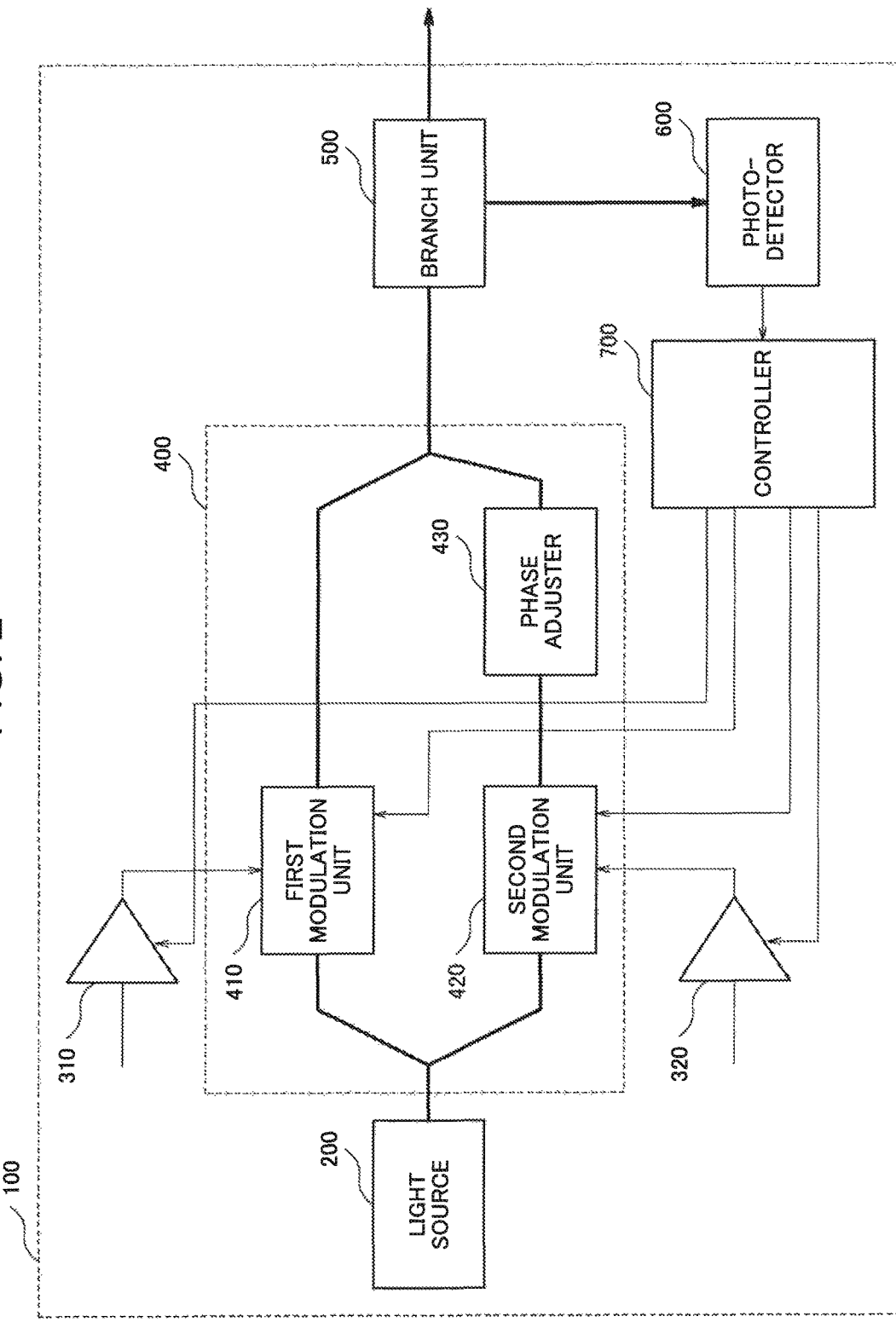
FIG. 2 is a block configuration diagram of an optical transmitter 100 according to a second example embodiment.

A second example embodiment will be described. A block configuration diagram of an optical transmitter according to the present example embodiment is illustrated in FIG. 2. In FIG. 2, an optical transmitter 100 includes a light source 200, a first driver unit 310, a second driver unit 320, an optical modulator 400, a branch unit 500, a photodetector 600, and a controller 700.

The light source 200 outputs continuous wave (CW) light. The CW light output from the light source 200 is divided into two lights in the optical modulator 400, and one of the lights is input to a first modulation unit 410 described below and the other light is input to a second modulation unit 420.

The first driver unit 310 receives an input of a data signal $_I$ encoded according to an applied modulation scheme from a framer circuit or the like, and also receives an input of a drive amplitude $_I$ on which a low-frequency dither signal is superimposed from the controller 700. The first driver unit 310 adjusts an amplitude of the input data signal $_I$ based on the input drive amplitude $_I$ and outputs an information electric signal $_I$ to the first modulation unit 410 of the optical modulator 400.

The second driver unit 320 receives an input of a data signal $_Q$ encoded according to the applied modulation scheme from a framer circuit or the like, and also receives an input of a drive amplitude $_Q$ on which a low-frequency dither signal is superimposed from the controller 700. The second driver unit 320 adjusts an amplitude of the input data signal $_Q$ based on the input drive amplitude $_Q$ and outputs an information electric signal $_Q$ to the second modulation unit 420 of the optical modulator 400.

The optical modulator 400 has a DC bias voltage V adjusted according to a DC bias value input from the controller 700 and on which a low-frequency dither signal is superimposed. The optical modulator 400 then uses the information electric signals input from the driver units 310 and 320 to perform optical modulation on the CW lights input from the light source 200, and outputs a modulation signal. As illustrated in FIG. 2, the optical modulator 400 according to the present example embodiment includes the first modulation unit 410, the second modulation unit 420, and a phase adjuster 430.

The first modulation unit 410 has a DC bias voltage $V_I$ adjusted in response to a DC bias value $_I$ input from the controller 700 and on which a low-frequency dither signal is superimposed. The first modulation unit 410 then uses the information electric signal $_I$ input from the first driver unit 310 to modulate one of the CW lights input from the light source 200, and outputs a modulation signal $_I$.

The second modulation unit 420 has a DC bias voltage $V_Q$ adjusted in response to the DC bias value $_I$ input from the controller 700 and on which the low-frequency dither signal is superimposed. The second modulation unit 420 then uses the information electric signal $_Q$ input from the second driver unit 320 to modulate the other CW light input from the light source 200, and outputs a modulation signal $_Q$.

The phase adjuster 430 shifts a phase of the modulation signal $_Q$ output from the second modulation unit 420 by π/2 and outputs the modulation signal $_Q$.

The modulation signal $_I$ output from the first modulation unit 410 and the modulation signal $_Q$ that is output from the phase adjuster 430 and that has the phase shifted by π/2 are multiplexed on a path to be output as a modulation signal from the optical modulator 400.

The branch unit 500 divides the modulation signal output from the optical modulator 400 into two modulation signals, and one of the modulation signals is transmitted to an optical transmission line and the other modulation signal is transmitted to the photodetector 600.

Figure 3:
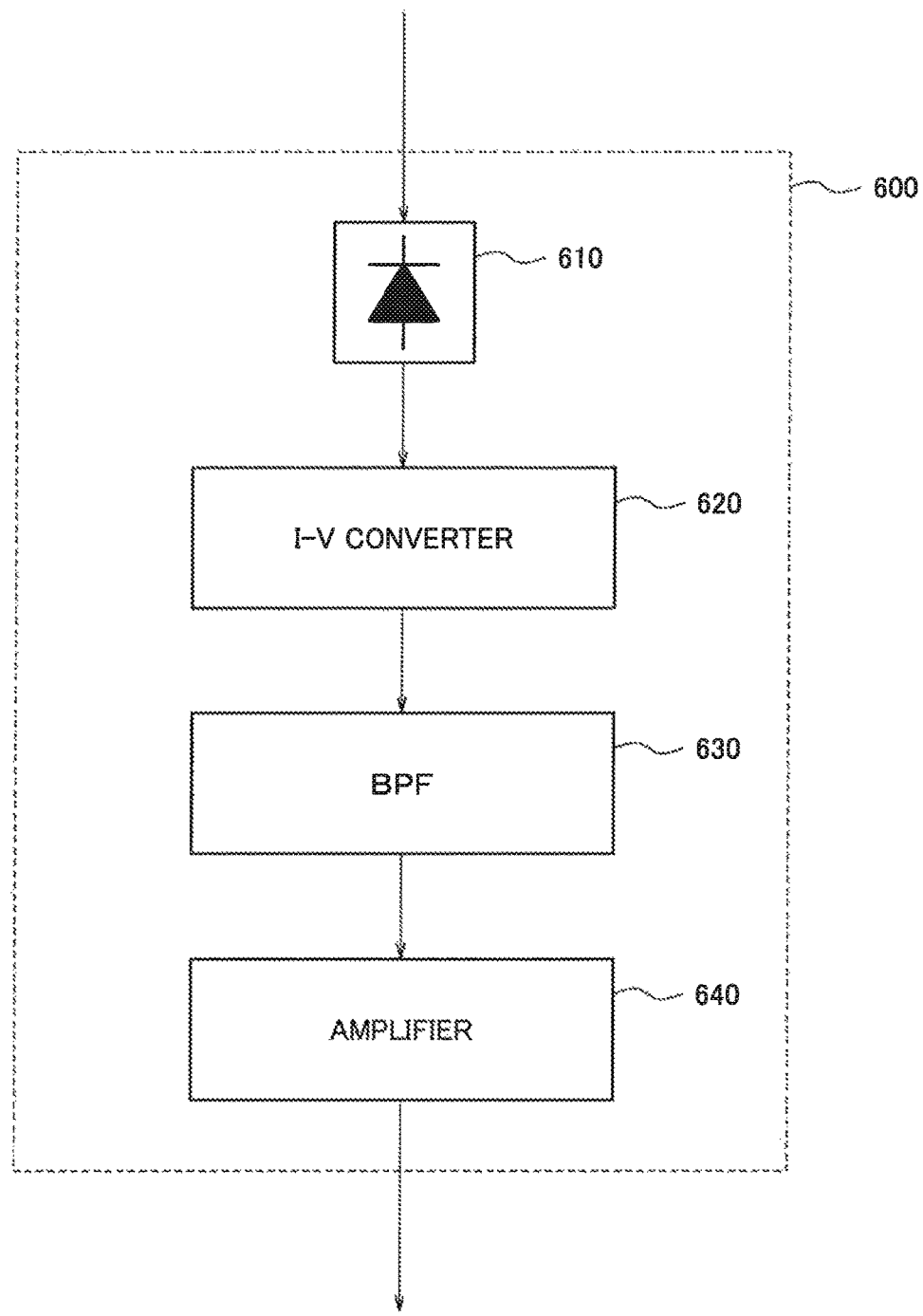
FIG. 3 is a block configuration diagram of a photodetector 600 according to the second example embodiment.

The photodetector 600 converts the modulation signal divided by the branch unit 500 to an electric signal, and outputs the electric signal to the controller 700 after extracting and amplifying a frequency component of a frequency $f_0$. A block configuration diagram of the photodetector 600 according to the present example embodiment is illustrated in FIG. 3. In FIG. 3, the photodetector 600 includes a photoelectric converter 610, a current-voltage converter 620, a narrow band pass filter (BPF) 630, and an amplifier 640.

The photoelectric converter 610 performs photoelectric conversion on the modulation signal divided by the branch unit 500 to an electric signal, and outputs a current value according to optical power of the modulation signal. The current-voltage converter 620 converts the current value according to the optical power of the modulation signal, which is output from the photoelectric converter 610, to a voltage value. The BPF 630 extracts a frequency component of a frequency $f_0$ from the output value of the current-voltage converter 620. The amplifier 640 amplifies the frequency component of the frequency $f_0$ extracted by the BPF 630 and outputs the frequency component to the controller 700.

The controller 700 generates a DC bias value to be output to the optical modulator 400 and a drive amplitude to be output to the driver units 310 and 320. The controller 700 also extracts a low-frequency dither signal from the frequency component $f_0$ input from the photodetector 600, and adjusts the generated DC bias value and the generated drive amplitude based on the extracted result. Furthermore, the controller 700 superimposes the low-frequency dither signal on each of the adjusted DC bias value and the adjusted drive amplitude, and respectively outputs the DC bias value and the drive amplitude to the optical modulator 400 and the driver units 310 and 320. The controller 700 will be described later.

Next, descriptions are given to control results when the optical transmitter 100 configured as described above to which a binary optical phase modulation scheme is applied and the optical transmitter 100 configured as described above to which a multi-level amplitude modulation scheme is applied are controlled by a DC bias value on which a low-frequency dither signal is superimposed or a drive amplitude on which a low-frequency dither signal is superimposed.

First, descriptions are given to a control result when control is performed on the optical transmitter 100 in the binary optical phase modulation scheme by using the DC bias value on which the low-frequency dither signal is superimposed and a control result when control is performed on the optical transmitter 100 in the multi-level amplitude modulation scheme by using the DC bias value on which the low-frequency dither signal is superimposed.

Figure 4:
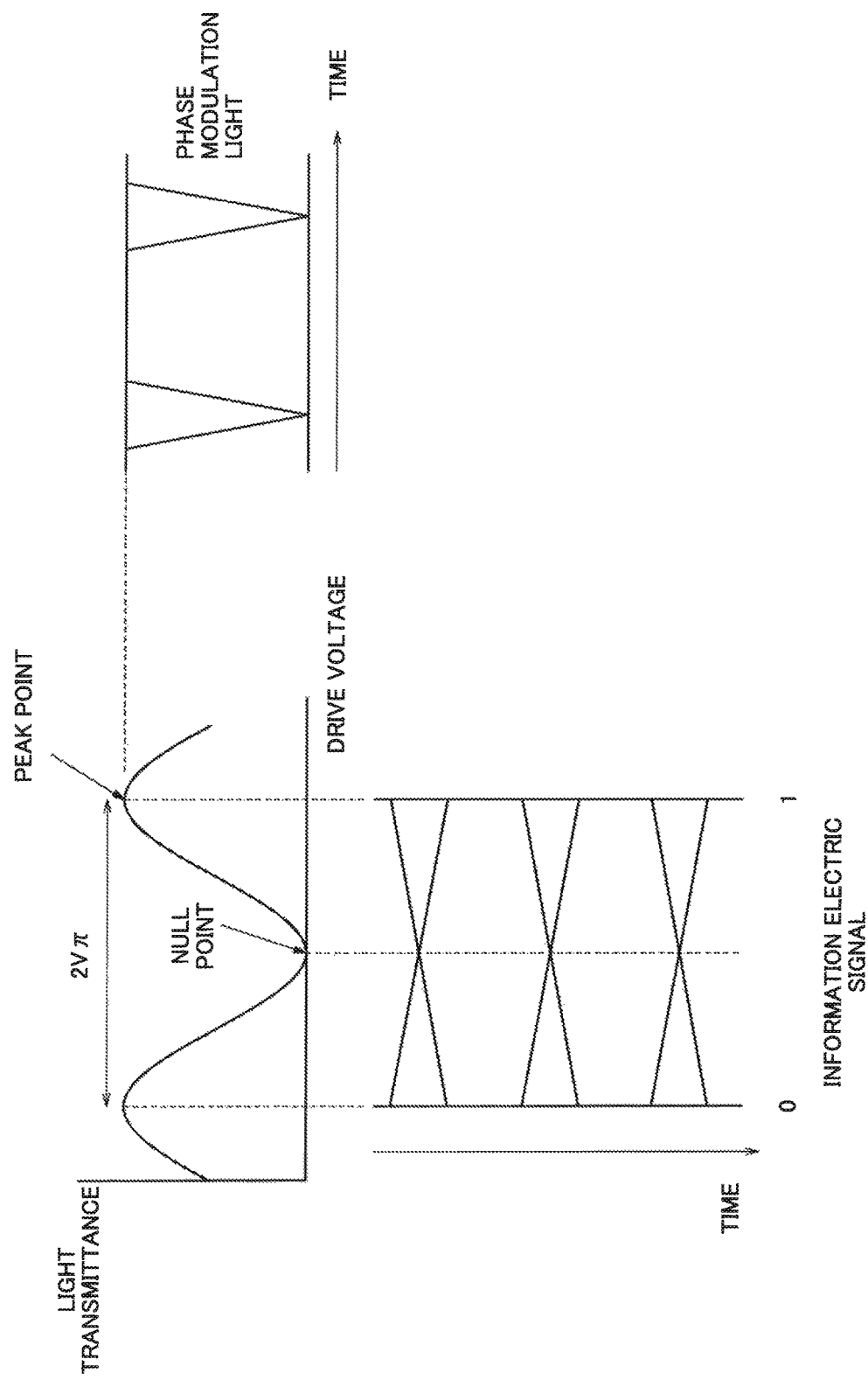
FIG. 4 is a diagram illustrating a relationship between a drive voltage and a light transmittance when a binary optical phase modulation scheme is applied to the optical transmitter 100 according to the second example embodiment.

FIG. 4 is a diagram illustrating a relationship between a drive voltage applied to the first modulation unit 410 and the second modulation unit 420 and an output of optical transmission of the optical modulator 400 in the optical transmitter 100 in the binary optical phase modulation in which a Mach-Zender optical modulator is applied to each of the first modulation unit 410 and the second modulation unit 420. In this case, the controller 700 adjusts a drive amplitude in such a way that "0"/"1" of an information electric signal coincides with adjacent peak points of transmission characteristics of the optical modulator 400, more specifically, "0"/"1" of an information electric signal is equal to a voltage difference (2 V$\pi$) between peak points. At the same time, the controller 700 adjusts a DC bias value in such a way that an average voltage (intermediate voltage) of "0"/"1" of a drive amplitude is set to a minimum (null) point of the transmission characteristics of the optical modulator 400. In this way, "0"/"1" of the information electric signal is converted to a carrier phase "0"/"$\pi$" of a modulation signal.

Specifically, a low-frequency dither signal at a frequency $f_0$ is superimposed on the DC bias value output to the optical modulator 400 to fluctuate the average voltage (DC bias voltage) of the information electric signal at the frequency $f_0$. A relationship between the DC bias voltage V at this time and a detected voltage of the $f_0$ component detected by the photodetector 600 is illustrated in FIG. 5.

Figure 5:
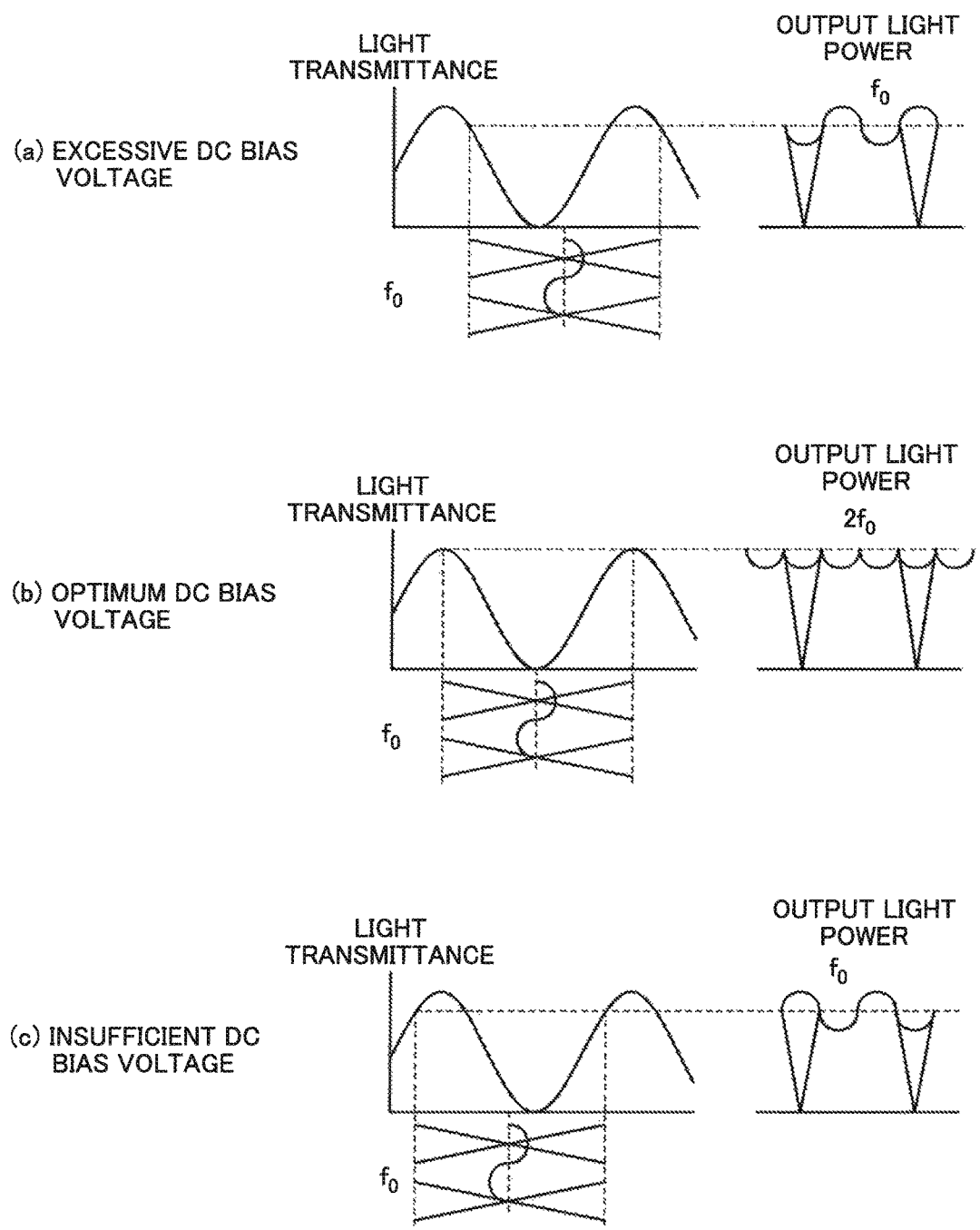
FIG. 5 is a diagram illustrating a control result when control using a DC bias value on which a low-frequency dither signal is superimposed is applied to the optical transmitter 100 in the binary optical phase modulation scheme.

As illustrated in FIG. 5(*b*), when a maximum voltage and a minimum voltage of an amplitude of the information electric signal coincide with peaks of the transmission characteristics of the optical modulator 400 and their average voltage (DC bias voltage) coincides with a null point, an amplitude change at a frequency 2 $f_0$ appears in the detected voltage of the $f_0$ component detected by the photodetector 600.

On the other hand, when the DC bias voltage is deviated from the null point, an amplitude change at a frequency $f_0$ appears in the detected voltage of the $f_0$ component detected by the photodetector 600, as illustrated in FIG. 5(*a*) or FIG. 5(*c*). Then, phases at the frequency $f_0$ when the DC bias voltage is great (FIG. 5(*a*)) and when the DC bias voltage is small (FIG. 5(*c*)) are opposite to each other. Therefore, in the optical transmitter 100 to which the binary modulation scheme is applied, "0"/"1" of the information electric signal is converted to the carrier phase "0"/"$\pi$" of the modulation signal by using the DC bias voltage on which the low-frequency dither signal is superimposed.

Next, description is given to a control result when control using a DC bias value on which a low-frequency dither signal is superimposed is applied to the optical transmitter 100 in a multi-level amplitude modulation scheme, such as 16 QAM or 64 QAM, including a plurality of kinds of drive electric signal amplitudes. A relationship between a drive voltage applied to the optical modulator 400 and an output of optical transmission of the optical modulator 400 when the 64 QAM modulation scheme is applied to the optical transmitter 100 is illustrated in FIG. 6.

Figure 6:
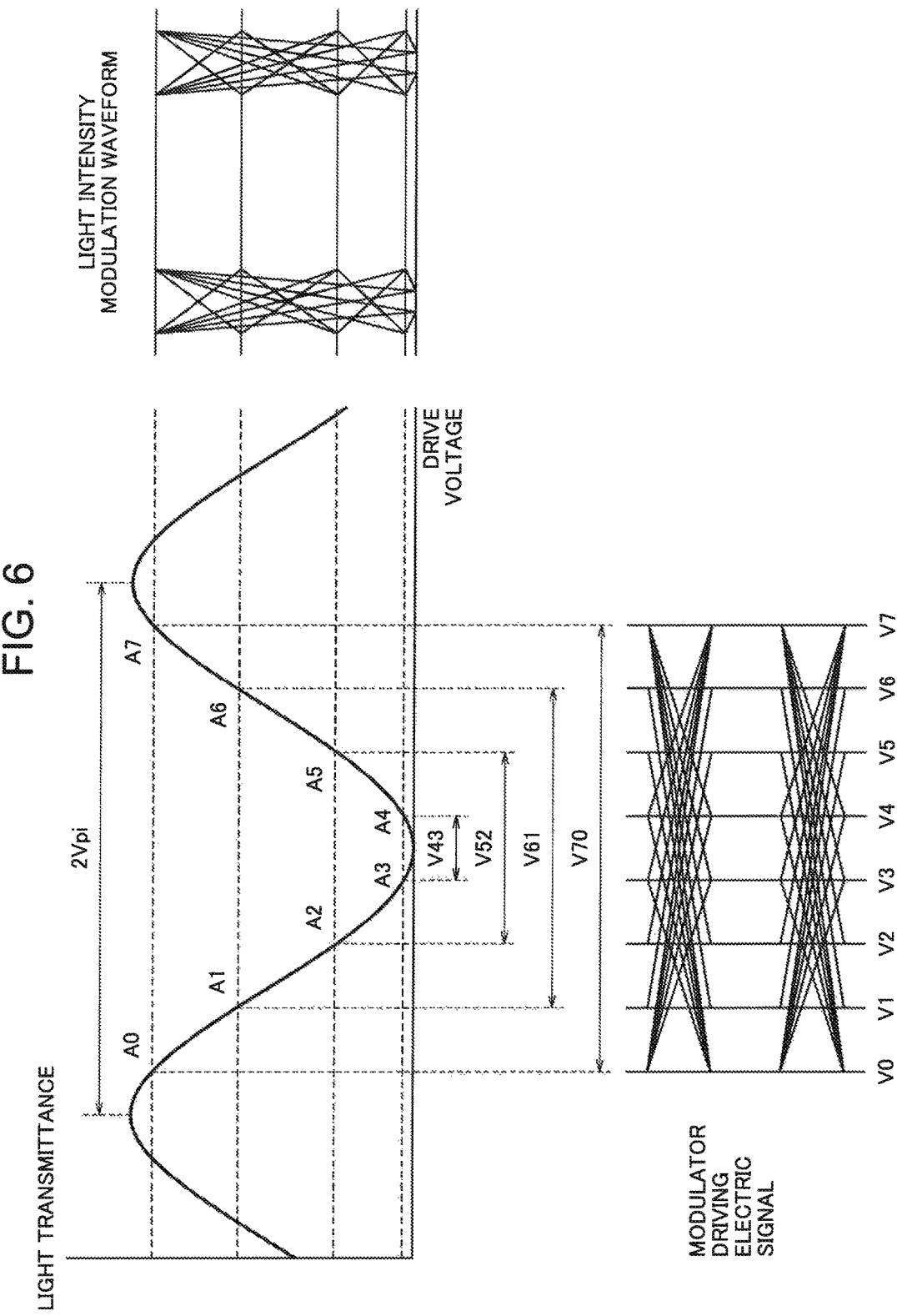
FIG. 6 is a diagram illustrating a relationship between a drive voltage and a light transmittance when a 64 QAM modulation scheme is applied to the optical transmitter 100 according to the second example embodiment.

As illustrated in FIG. 6, eight points from $A_0$ to $A_7$ are needed as a drive voltage in the 64 QAM modulation scheme. Hereinafter, descriptions are given to control results on four kinds of drive amplitudes, which are $V_{43}$ (=$A_4$–$A_3$), $V_{52}$ (=$V_5$–$V_2$), $V_{61}$ (=$V_6$–$V_1$), and $V_{70}$ (=$V_7$–$V_0$), when a DC bias value on which a low-frequency dither signal is superimposed is used based on a specific simulation result.

With drive amplitudes as $V_{43}$=0.28 V$\pi$, $V_{52}$=0.84 V$\pi$, $V_{61}$=1.40 V$\pi$, and $V_{70}$=1.96 V$\pi$, a simulation result when control using the DC bias value on which the low-frequency dither signal is superimposed is applied is illustrated in FIG. 7(*a*). With lower drive amplitudes as $V_{43}$=0.24 V$\pi$, $V_{52}$=0.72 V$\pi$, $V_{61}$=1.20 V$\pi$, and $V_{70}$=1.60 V$\pi$, a simulation result when control using the DC bias value on which the low-frequency dither signal is superimposed is applied is illustrated in FIG. 7(*b*). In FIGS. 7(*a*) and 7(*b*), four kinds of solid lines are respective demodulation voltages corresponding to the above-mentioned four kinds of the drive amplitudes, and a broken line is a detected voltage (total voltage) detected by the photodetector 600.

In FIG. 7(*a*), when the DC bias voltage is shifted positively (0 to 1 V$\pi$) from an optimum point (0 V), a detected voltage (broken line) of the $f_0$ component detected by the photodetector 600 is a negative voltage, and when the DC bias voltage is shifted negatively (0 to −1 V$\pi$) from the optimum point (0 V), the detected voltage is a positive voltage. On the other hand, in FIG. 7(*b*), in a case where a drive electric signal amplitude is slightly smaller than that in FIG. 7(*a*), when the DC bias voltage is shifted positively (0 to 1 V$\pi$) from an optimum point (0 V), a detected voltage (broken line) of the $f_0$ component detected by the photodetector 600 is a positive voltage, and when the DC bias voltage is shifted negatively (0 to −1 V$\pi$) from the optimum point (0 V), the detected voltage is a negative voltage.

In other words, in the optical transmitter 100 to which the multi-level amplitude modulation scheme is applied, when control using the DC bias voltage on which the low-frequency dither signal is superimposed is applied, a direction of deviation from the optimum point (null point) of the DC bias voltage is not determined solely by the detected voltage of the $f_0$ component detected by the photodetector 600. In this case, the DC bias voltage cannot be controlled at the null point, and thus a demodulation signal cannot be stably detected only by superimposing the low-frequency dither signal on the DC bias voltage in the optical transmitter 100 to which the multi-level amplitude modulation scheme is applied. Thus, in the optical transmitter 100 according to the present example embodiment, the low-frequency dither signal is further superimposed on drive amplitudes output to the driver units 310 and 320.

Next, descriptions are given to control results when control using a drive amplitude on which a low-frequency dither signal is superimposed is performed on the optical transmitter 100 in the multi-level amplitude modulation scheme. Note that descriptions are given below to the control results when the control using the drive amplitude on which the low-frequency dither signal is superimposed is applied to the optical transmitter 100 in the 64 QAM modulation scheme under the same conditions as those described with FIG. 7.

With drive amplitudes as $V_{43}$=0.28 V$\pi$, $V_{52}$=0.84 V$\pi$, $V_{61}$=1.40 V$\pi$, and $V_{70}$=1.96 V$\pi$, a simulation result when control using the drive amplitude on which the low-frequency dither signal is superimposed is applied is illustrated in FIG. 8(*a*). With lower drive amplitudes as $V_{43}$=0.24 V$\pi$, $V_{52}$=0.72 V$\pi$, $V_{61}$=1.20 V$\pi$, and $V_{70}$=1.60 V$\pi$, a simulation result when control using the drive amplitude on which the low-frequency dither signal is superimposed is applied is illustrated in FIG. 8(*b*). Also in FIGS. 8(*a*) and 8(*b*), four kinds of solid lines are respective demodulation voltages corresponding to the above-mentioned four kinds of the drive amplitudes, and a broken line is a detected voltage (total voltage) detected by the photodetector 600.

Even when the drive amplitudes change from those in FIGS. 8(a) and 8(b), a DC bias voltage of the detected voltage detected by the photodetector 600 is a positive voltage within a range from −0.5 Vπ to +0.5 Vπ with the optimum point (0 V) as the center and is a negative voltage in the other voltage range. In this case, deviation from the optimum point (null point) can be detected by superimposing the low-frequency dither signal on the drive amplitudes and the DC bias voltage can be controlled at the null point in the optical transmitter 100 to which the multi-level amplitude modulation scheme is applied.

Figure 9:
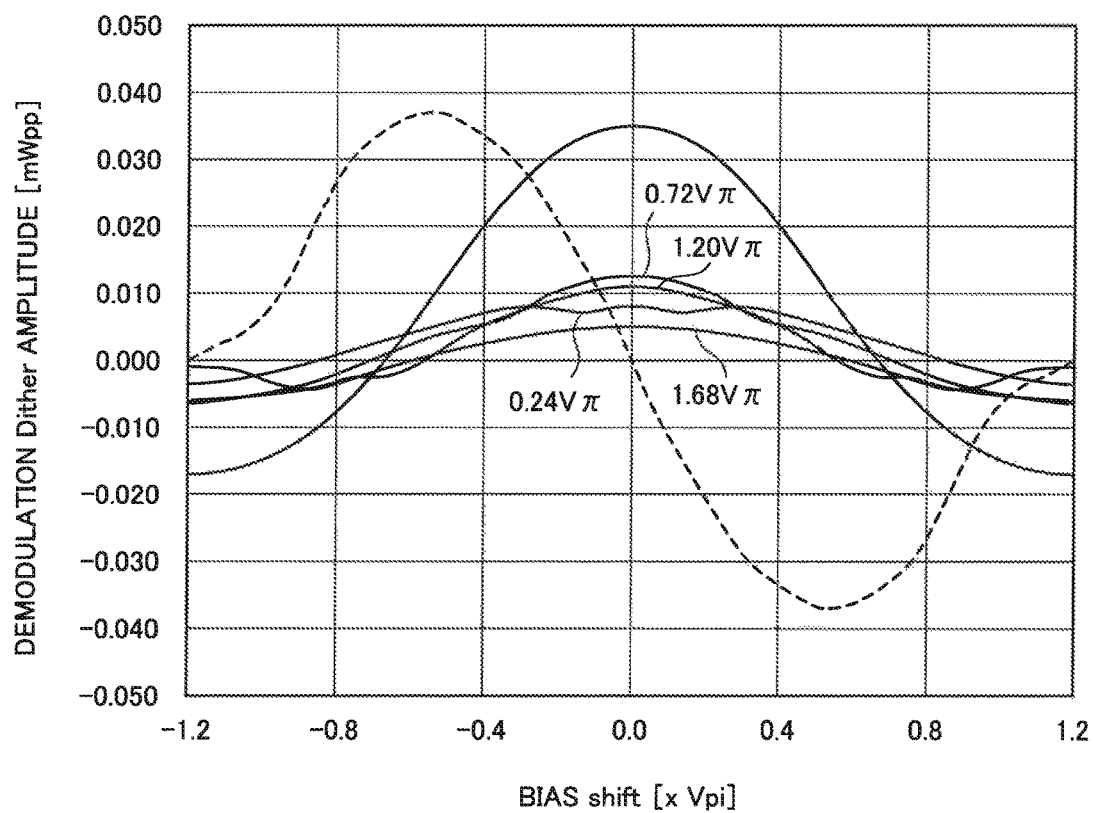
FIG. 9 is a simulation result on a differential value when control using the drive amplitude on which the low-frequency dither signal is superimposed is applied.

Furthermore, a result of differentiating the detected voltage in FIG. 8 with a low-frequency dither signal is illustrated in FIG. 9. As indicated by a broken line in FIG. 9, when the DC bias voltage is shifted positively (0 to 1 Vπ) from the optimum point (0 V), the detected voltage differentiated with the low-frequency dither signal is a negative voltage. On the other hand, when the DC bias voltage is shifted negatively (0 to −1 Vπ) from the optimum point (0 V), the detected voltage differentiated with the low-frequency dither signal is a positive voltage. Therefore, even when the multi-level amplitude modulation scheme is applied to the optical transmitter 100, the DC bias voltage can be stably controlled at the optimum point (null point) by using the result of differentiating the detected voltage with the low-frequency dither signal, similarly to the control when the low-frequency dither signal is superimposed on the DC bias voltage value through application of the binary modulation scheme.

Figure 10:
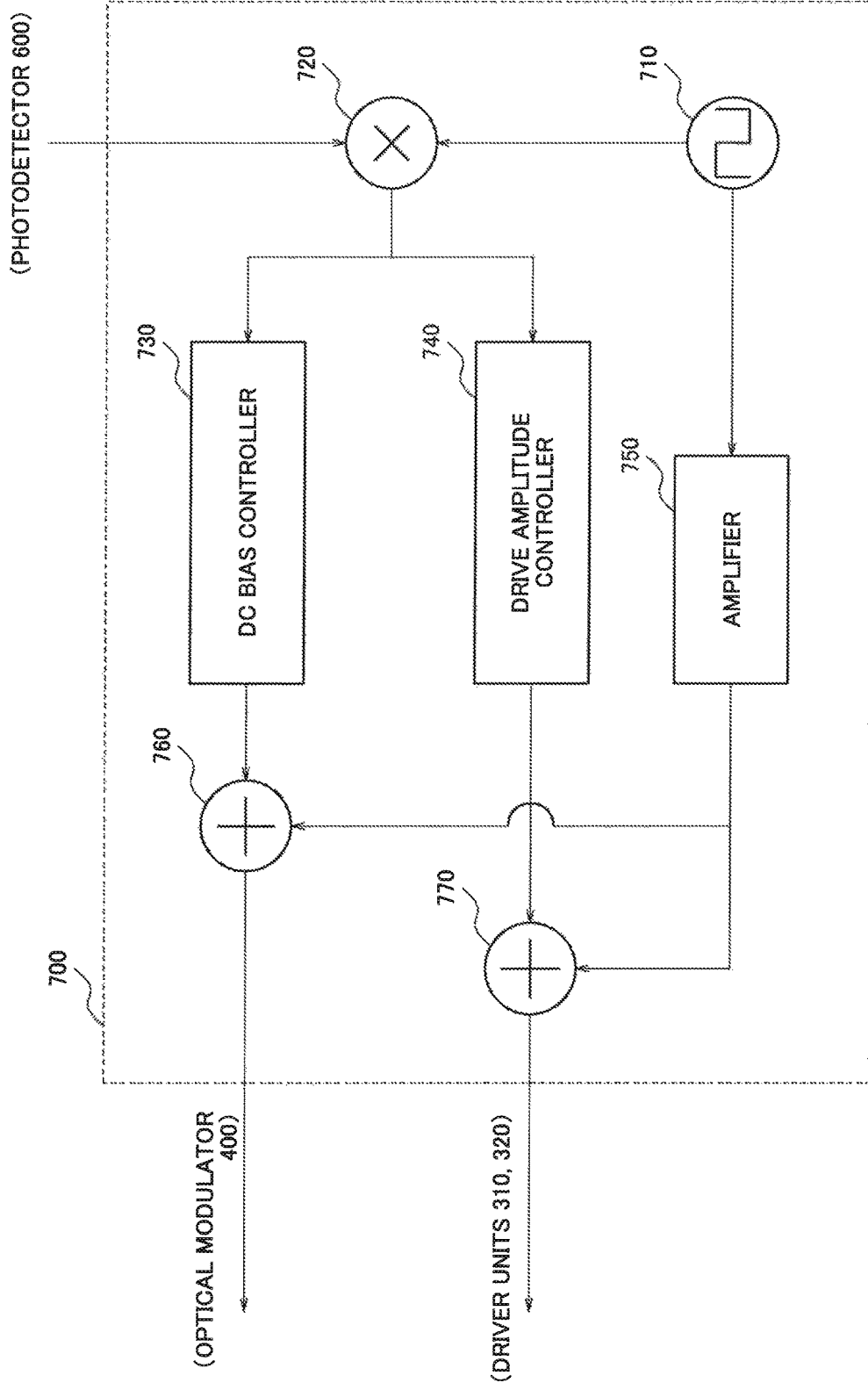
FIG. 10 is a block configuration diagram of a controller 700 according to the second example embodiment.

Next, a procedure of performing the above-mentioned control by the controller 700 according to the present example embodiment is described together with a configuration of the controller 700. An example of a block configuration diagram of the controller 700 is illustrated in FIG. 10. In FIG. 10, the controller 700 includes a low-frequency signal generator 710, a multiplier 720, a DC bias controller 730, a drive amplitude controller 740, an amplifier 750, a first adder 760, and a second adder 770.

The low-frequency signal generator 710 generates a rectangular wave signal at a frequency $f_0$ and outputs the rectangular wave signal to the multiplier 720 and the amplifier 750. Note that the low-frequency signal generator 710 can also generate a sinusoidal signal at the frequency $f_0$.

The multiplier 720 multiplies the frequency component of the frequency $f_0$ input from the photodetector 600 by the rectangular wave signal at the frequency $f_0$ input from the low-frequency signal generator 710, and outputs the resultant value to the DC bias controller 730 and the drive amplitude controller 740.

The DC bias controller 730 generates a DC bias value for controlling an average voltage value (DC bias voltage) of "0"/"1" of a drive amplitude to coincide with a minimum (null) point of the transmission characteristics of the optical modulator 400. The DC bias controller 730 then adjusts the generated DC bias value based on the multiplication value input from the multiplier 720 or an amount of fluctuation (differential value) of the multiplication value, and outputs the DC bias value to the first adder 760.

Specifically, the DC bias controller 730 adjusts the generated DC bias value based on the multiplication value input from the multiplier 720 when the binary phase modulation scheme is applied to the optical transmitter 100. On the other hand, the DC bias controller 730 adjusts the generated DC bias value based on the amount of fluctuation (differential value) of the multiplication value input from the multiplier 720 when the multi-level amplitude modulation scheme is applied to the optical transmitter 100.

The drive amplitude controller 740 generates a drive amplitude for controlling "0"/"1" of an information electric signal to coincide with a voltage between peaks of the transmission characteristics of the optical modulator 400. The drive amplitude controller 740 then adjusts the generated drive amplitude based on the multiplication value input from the multiplier 720 or the amount of fluctuation (differential value) of the multiplication value, and outputs the drive amplitude to the second adder 770. Similarly to the DC bias controller 730, the drive amplitude controller 740 adjusts the drive amplitude based on the multiplication value input from the multiplier 720 when the binary phase modulation scheme is applied, and adjusts the drive amplitude based on the amount of fluctuation (differential value) of the multiplication value input from the multiplier 720 when the multi-level amplitude modulation scheme is applied.

In other words, when the binary phase modulation scheme is applied to the optical transmitter 100, the DC bias controller 730 and the drive amplitude controller 740 adjust the DC bias value and the drive amplitude to a position where a change in a frequency $2 f_0$ appears while monitoring a magnitude of the multiplication value input from the multiplier 720 (the control in FIG. 5). On the other hand, when the multi-level amplitude modulation scheme is applied, the DC bias controller 730 and the drive amplitude controller 740 adjust the DC bias value and the drive amplitude to a position where the amount of fluctuation (differential value) of the multiplication value input from the multiplier 720 is zero. The control at this time is illustrated in FIG. 11.

Figure 11:
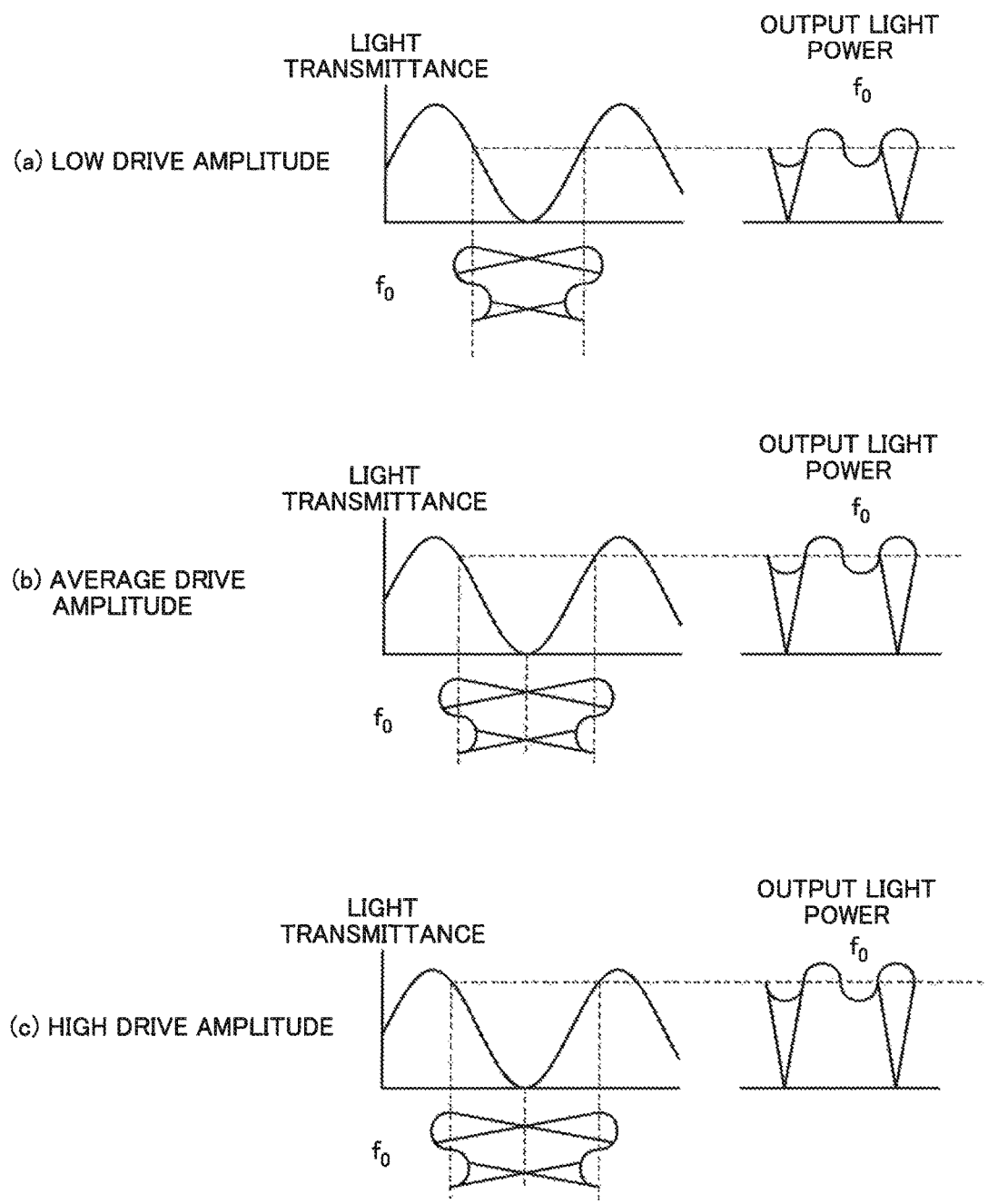
FIG. 11 is a diagram illustrating control results when control using a drive amplitude on which a low-frequency dither signal is superimposed is applied to an optical transmitter 100 in a multi-level optical phase modulation scheme.

FIG. 11 illustrates the amount of fluctuation (differential value) of the multiplication value input from the multiplier 720 when the multi-level amplitude modulation scheme is applied. As seen from FIG. 11, even when the drive amplitude changes, the DC bias voltage is zero at the null point. Therefore, the DC bias controller 730 and the drive amplitude controller 740 adjust the DC bias value and the drive amplitude in such a way that the value of the DC bias voltage is zero, thereby enabling to keep a relationship between a modulator driving electric signal and a drive voltage-light transmittance of an optical modulator at an optimum point.

The amplifier 750 amplifies an amplitude of the rectangular wave signal at the frequency $f_0$ input from the low-frequency signal generator 710 and generates a low-frequency dither signal. The amplifier 750 outputs the generated low-frequency dither signal to the first adder 760 and the second adder 770 alternately. Note that information about output timing of the low-frequency dither signal is output to the DC bias controller 730 and the drive amplitude controller 740. The DC bias controller 730 and the drive amplitude controller 740 distinguish between the multiplication value when the low-frequency dither signal is superimposed on the drive amplitude and the multiplication value when the low-frequency dither signal is superimposed on the DC bias value, based on this timing information.

The first adder 760 adds the low-frequency dither signal input from the amplifier 750 to the DC bias value input from the DC bias controller 730, and outputs the DC bias value on which the low-frequency dither signal is superimposed to the first modulation unit 410 and the second modulation unit 420 of the optical modulator 400.

The second adder 770 adds the low-frequency dither signal input from the amplifier 750 to the drive amplitude input from the drive amplitude controller 740, and outputs the drive amplitude on which the low-frequency dither signal is superimposed to the first driver unit 310 and the second driver unit 320.

Note that in the present example embodiment, the rectangular wave signal at the frequency $f_0$ generated by the low-frequency signal generator 710 is time-divided by the amplifier 750 and is input to the first adder 760 and the second adder 770 alternately, but is not limited to this. Two low-frequency signal generators may be disposed to generate rectangular wave signals at low frequencies $f_1$ and $f_2$ having different frequencies from each other, and a low-frequency dither signal at the frequency $f_1$ may be superimposed on a DC bias value while a low-frequency dither signal at the frequency $f_2$ may be superimposed on a drive amplitude.

As described above, when a multi-level amplitude modulation scheme, such as 16 QAM and 64 QAM, is applied to the optical transmitter 100 according to the present example embodiment, a low-frequency dither signal at a frequency $f_0$ is superimposed on a drive amplitude, the low-frequency dither signal is extracted from a modulation signal output from the optical modulator 400, and a DC bias value to be output to the optical modulator 400 and a drive amplitude to be output to the driver units 310 and 320 are adjusted based on a differential value of the extracted low-frequency dither signal. In this case, even in multi-level quadrature phase amplitude modulation, a relationship between a modulator driving electric signal and a drive voltage-light transmittance of an optical modulator, which is an important characteristic in control of the optical modulator 400 by multi-level modulation, can be kept at an optimum point.

Furthermore, the optical transmitter 100 described above can switch the extracted low-frequency dither signal between binary phase modulation and multi-level quadrature phase amplitude modulation. In this way, even when either of the modulation schemes is applied, an optimum point of a drive voltage of the optical modulator 400 can be controlled by the same controller 700. Therefore, drive voltage control can also be performed according to an applied modulation scheme on a variable modulation scheme optical transmitter used by switching a plurality of optical modulation schemes, which is expected to go mainstream in the future. In other words, regardless of whether an information electric signal rate is 40 Gbit/s or 100 Gbit/s, the above-mentioned control operation is not affected, resulting in no dependence on a bit rate. The present invention is also applicable to a modulation scheme such as binary phase modulation and octal phase modulation instead of quadrature phase modulation, or to a modulation scheme that combines phase modulation such as m value-QAM and intensity modulation.

Herein, even when signals have different bit rates such as 10 Gbit/s, 40 Gbit/s, and 100 Gbit/s for an information electric signal rate, the frequency $f_0$ of a dither signal can be a low frequency of the order of kHz. Thus, the photoelectric converter 610, the current-voltage converter 620, and the amplifier 640 that form the photodetector 600 and the multiplier 720, the amplifier 750, the first adder 760, the second adder 770, and the like that form the controller 700 may operate at a low rate of the order of kHz, and the optical transmitter 100 can be formed of inexpensive parts for a low rate instead of parts for an ultrafast signal.

The present invention is not limited to the example embodiment described above, and the present invention may include various design modifications or the like being made without departing from the purpose of the invention. This application is based upon and claims the benefit of priority from Japanese patent application No. 2015-189327, filed on Sep. 28, 2015, the disclosure of which is incorporated herein in its entirety by reference.

REFERENCE SIGNS LIST

10 Modulator
20 Amplitude information control means
30 Bias value control means
40 Data output means
50 Modulation means
60 Adjustment means
100 Optical transmitter
200 Light source
310 First driver unit
320 Second driver unit
400 Optical modulator
500 Branch unit
600 Photodetector
610 Photoelectric converter
620 Current-voltage converter
630 BPF
640 Amplifier
700 Controller
710 Low-frequency signal generator
720 Multiplier
730 DC bias controller
740 Drive amplitude controller
750 Amplifier
760 First adder
770 Second adder

The invention claimed is:

1. An optical modulator comprising:
an amplitude information controller configured to generate amplitude information for controlling an amplitude of an information signal to correspond to a transmission characteristic of a modulator, add a dither signal to the amplitude information, and output the amplitude information;
a bias value controller configured to generate and output a bias value for controlling a center of an amplitude of the information signal to correspond to a transmission characteristic of the modulator;
a data output circuit configured to correct an amplitude of information data inputted, based on the amplitude information outputted and output the information data as the information signal;
the modulator configured to correct a center of an amplitude of the information signal outputted, based on the bias value outputted, modulate input continuous wave light by using the information signal, and outputting a modulation signal;
an adjustment circuit configured to extract a dither signal added to the amplitude information from the modulation signal outputted, and adjust the amplitude information generated and the bias value generated in such a way that a differential value of intensity of the dither signal extracted added to the amplitude information is set to zero; and
an signal generator configured to generate and output a dither signal of a rectangular wave signal or a sinusoidal signal at a low frequency $f_0$, wherein
the bias value controller adds the dither signal to the bias value generated and outputs the bias value generated, and
the adjustment circuit extracts a dither signal added to the bias value from the modulation signal outputted instead of extracting a dither signal added to the amplitude information, when a binary modulation scheme is applied, and adjusts the amplitude information generated and the bias value generated in such a way that a period of the extracted dither signal added to the bias value is set to 2 $f_0$.

2. The optical modulator according to claim 1, wherein the data output circuit receives an input of the information data subjected to framer processing in a framer circuit, and the optical modulator further comprises switching circuit configured to acquire information about a modulation scheme from the framer circuit, and switching an output destination of a dither signal between the amplitude information controller and the bias value controller in response to the acquired modulation scheme.

3. The optical modulator according to claim 2, wherein the adjustment circuit includes
   a photoelectric converter configured to convert the modulation signal outputted to an electric signal, and
   an extraction circuit configured to extract a frequency $f_0$ component from the electric signal converted and output the frequency $f_0$ component as a dither signal.

4. The optical modulator according to claim 3, wherein the data output circuit includes
   a first data output circuit configured to correct an amplitude of first information data, based on first amplitude information, and output the first information data as a first information signal, and
   a second data output circuit configured to correct an amplitude of second information data, based on second amplitude information, and output the second information data as a second information signal, and
the amplitude information controller generates first amplitude information and second amplitude information in such a way that amplitudes of the first information signal and the second information signal are set to be equal to a difference between a maximum value and a minimum value of the modulator, adds a dither signal to each of the first amplitude information and the second amplitude information, and outputs the first amplitude information and the second amplitude information.

5. The optical modulator according to claim 4, wherein the modulator includes
   a branch configured to divide continuous wave light inputted into two continuous beams of light,
   a first modulator configured to correct a center of an amplitude of the first information signal outputted, based on a first bias value, modulating one of the continuous beams of light divided by using the first information signal, and output a first modulation signal,
   a second modulator configured to correct a center of an amplitude of the output second information signal, based on a second bias value, modulating another of the continuous beams of light divided by using the second information signal, and output a second modulation signal,
   a phase adjustment circuit configured to shift a phase of the second modulation signal outputted by $\pi/2$, and
   a multiplexer configured to multiplex the first modulation signal and the second modulation signal having the phase shifted by $\pi/2$ and output the modulation signal, and
the bias value controller generates a first bias value and a second bias value in such a way that a center of amplitudes of the first information signal and the second information signal is set to a minimum point of a transmission characteristic of the modulator, and outputs the first bias value and the second bias value.

6. The optical modulator according to claim 2, wherein the data output circuit includes
   a first data output circuit configured to correct an amplitude of first information data, based on first amplitude information, and output the first information data as a first information signal, and
   a second data output circuit configured to correct an amplitude of second information data, based on second amplitude information, and output the second information data as a second information signal, and
the amplitude information controller generates first amplitude information and second amplitude information in such a way that amplitudes of the first information signal and the second information signal are set to be equal to a difference between a maximum value and a minimum value of the modulator, adds a dither signal to each of the first amplitude information and the second amplitude information, and outputs the first amplitude information and the second amplitude information.

7. The optical modulator according to claim 6, wherein the modulator includes
   a branch configured to divide continuous wave light inputted into two continuous beams of light,
   a first modulator configured to correct a center of an amplitude of the first information signal outputted, based on a first bias value, modulating one of the continuous beams of light divided by using the first information signal, and output a first modulation signal,
   a second modulator configured to correct a center of an amplitude of the output second information signal, based on a second bias value, modulating another of the continuous beams of light divided by using the second information signal, and output a second modulation signal,
   a phase adjustment circuit configured to shift a phase of the second modulation signal outputted by $\pi/2$, and
   a multiplexer configured to multiplex the first modulation signal and the second modulation signal having the phase shifted by $\pi/2$ and output the modulation signal, and
the bias value controller generates a first bias value and a second bias value in such a way that a center of amplitudes of the first information signal and the second information signal is set to a minimum point of a transmission characteristic of the modulator, and outputs the first bias value and the second bias value.

8. An optical transmitter comprising:
a light output circuit configured to generate and output continuous wave light; and
the optical modulator according to claim 2, configured to modulate the continuous wave light outputted.

9. An optical transmitter comprising:
a light output circuit configured to generate and output continuous wave light; and
the optical modulator according to claim 1, configured to modulate the continuous wave light outputted.

10. The optical modulator according to claim 1, wherein the adjustment circuit includes
   a photoelectric converter configured to convert the modulation signal outputted to an electric signal, and an extraction circuit configured to extract a frequency $f_0$ component from the electric signal converted and output the frequency $f_0$ component as a dither signal.

11. The optical modulator according to claim 10, wherein the data output circuit includes
  a first data output circuit configured to correct an amplitude of first information data, based on first amplitude information, and output the first information data as a first information signal, and
  a second data output circuit configured to correct an amplitude of second information data, based on second amplitude information, and output the second information data as a second information signal, and
the amplitude information controller generates first amplitude information and second amplitude information in such a way that amplitudes of the first information signal and the second information signal are set to be equal to a difference between a maximum value and a minimum value of the modulator, adds a dither signal to each of the first amplitude information and the second amplitude information, and outputs the first amplitude information and the second amplitude information.

12. The optical modulator according to claim 11, wherein the modulator includes
  a branch configured to divide continuous wave light inputted into two continuous beams of light,
  a first modulator configured to correct a center of an amplitude of the first information signal outputted, based on a first bias value, modulating one of the continuous beams of light divided by using the first information signal, and output a first modulation signal,
  a second modulator configured to correct a center of an amplitude of the output second information signal, based on a second bias value, modulating another of the continuous beams of light divided by using the second information signal, and output a second modulation signal,
  a phase adjustment circuit configured to shift a phase of the second modulation signal outputted by $\pi/2$, and
  a multiplexer configured to multiplex the first modulation signal and the second modulation signal having the phase shifted by $\pi/2$ and output the modulation signal, and
the bias value controller generates a first bias value and a second bias value in such a way that a center of amplitudes of the first information signal and the second information signal is set to a minimum point of a transmission characteristic of the modulator, and outputs the first bias value and the second bias value.

13. The optical modulator according to claim 1, wherein the data output circuit includes
  a first data output circuit configured to correct an amplitude of first information data, based on first amplitude information, and output the first information data as a first information signal, and
  a second data output circuit configured to correct an amplitude of second information data, based on second amplitude information, and output the second information data as a second information signal, and
the amplitude information controller generates first amplitude information and second amplitude information in such a way that amplitudes of the first information signal and the second information signal are set to be equal to a difference between a maximum value and a minimum value of the modulator, adds a dither signal to each of the first amplitude information and the second amplitude information, and outputs the first amplitude information and the second amplitude information.

14. The optical modulator according to claim 13, wherein the modulator includes
  a branch configured to divide continuous wave light inputted into two continuous beams of light,
  a first modulator configured to correct a center of an amplitude of the first information signal outputted, based on a first bias value, modulating one of the continuous beams of light divided by using the first information signal, and output a first modulation signal,
  a second modulator configured to correct a center of an amplitude of the output second information signal, based on a second bias value, modulating another of the continuous beams of light divided by using the second information signal, and output a second modulation signal,
  a phase adjustment circuit configured to shift a phase of the second modulation signal outputted by $\pi/2$, and
  a multiplexer configured to multiplex the first modulation signal and the second modulation signal having the phase shifted by $\pi/2$ and output the modulation signal, and
the bias value controller generates a first bias value and a second bias value in such a way that a center of amplitudes of the first information signal and the second information signal is set to a minimum point of a transmission characteristic of the modulator, and outputs the first bias value and the second bias value.

15. An optical transmitter comprising:
a light output circuit configured to generate and output continuous wave light; and
the optical modulator according to claim 1, configured to modulate the continuous wave light outputted.

16. An optical modulation method comprising:
generating amplitude information for controlling an amplitude of an information signal to correspond to a transmission characteristic of a modulator, adding a dither signal to the amplitude information, and outputting the amplitude information;
generating and outputting a bias value for controlling a center of an amplitude of the information signal to correspond to a transmission characteristic of the modulator;
correcting an amplitude of information data outputted, based on the amplitude information outputted and outputting the information data as the information signal;
correcting a center of an amplitude of the information signal outputted, based on the bias value outputted by using the modulator, modulating continuous wave light by using the information signal, and outputting a modulation signal;
extracting a dither signal added to the amplitude information from the modulation signal outputted, and adjusting the amplitude information generated and the bias value generated in such a way that a differential value of intensity of the dither signal extracted added to the amplitude information is set to zero; and
generating and outputting a dither signal of a rectangular wave signal or a sinusoidal signal at a low frequency $f_0$, wherein generating and outputting the bias value comprises adding the dither signal to the bias value generated and outputting the bias value generated, and extracting the dither signal comprises extracting a dither signal added to the bias value from the modulation signal outputted instead of extracting a dither signal added to the amplitude information, when a binary modulation scheme is applied, and adjusts the amplitude information generated and the bias value generated in such a way that a period of the extracted dither signal added to the bias value is set to 2 $f_0$.

* * * * *